US009908602B1

(12) United States Patent
Njah

(10) Patent No.: US 9,908,602 B1
(45) Date of Patent: Mar. 6, 2018

(54) WATER BIKE

(71) Applicant: Mounir Njah, Blaine, MN (US)

(72) Inventor: Mounir Njah, Blaine, MN (US)

( * ) Notice: Subject to any disclaimer, the term of this patent is extended or adjusted under 35 U.S.C. 154(b) by 0 days.

(21) Appl. No.: 15/249,764

(22) Filed: Aug. 29, 2016

Related U.S. Application Data

(60) Provisional application No. 62/285,544, filed on Nov. 2, 2015.

(51) Int. Cl.
| *B63H 1/38* | (2006.01) |
| *B63H 16/20* | (2006.01) |
| *B63H 21/20* | (2006.01) |
| *B63H 16/08* | (2006.01) |
| *B63B 35/73* | (2006.01) |

(52) U.S. Cl.
CPC ............. *B63H 16/08* (2013.01); *B63B 35/73* (2013.01); *B63H 21/20* (2013.01)

(58) Field of Classification Search
CPC ........ B63H 16/08; B63H 21/20; B63H 16/12; B63B 35/73
USPC ....................................... 440/100, 12.66, 98
See application file for complete search history.

(56) References Cited

U.S. PATENT DOCUMENTS

| 537,921 | A | * | 4/1895 | Fernandes | ............. | B60F 3/0084 |
| | | | | | | 416/86 |
| 1,049,661 | A | * | 1/1913 | Bretney | ................... | B63H 1/38 |
| | | | | | | 440/100 |
| 1,104,229 | A | * | 7/1914 | Szegel | .................. | B60F 3/0084 |
| | | | | | | 244/23 R |
| 3,249,084 | A | * | 5/1966 | Plants | ...................... | B63H 1/38 |
| | | | | | | 114/283 |
| 3,606,856 | A | * | 9/1971 | Moraga | ................. | B60F 3/0084 |
| | | | | | | 440/100 |
| 4,395,237 | A | * | 7/1983 | Watanabe | ............. | B60F 3/0084 |
| | | | | | | 440/100 |
| 5,088,944 | A | | 2/1992 | Kats | | |
| 5,316,508 | A | | 5/1994 | Landucci | | |
| 5,626,501 | A | | 5/1997 | He | | |
| 7,445,530 | B2 | * | 11/2008 | Munshaur | ............... | B60B 19/06 |
| | | | | | | 440/12.66 |
| 8,302,728 | B1 | * | 11/2012 | Dotson | ................ | A63H 17/262 |
| | | | | | | 180/408 |

* cited by examiner

*Primary Examiner* — Anthony D Wiest
(74) *Attorney, Agent, or Firm* — Berggren Law Office, LLC

(57) ABSTRACT

A water bike apparatus powered by at least human energy or a motor and comprising motion-inducing flotation elements with steering elements and with no stationary flotation elements necessary for flotation of the apparatus.

6 Claims, 7 Drawing Sheets

WATER BIKE

FIELD OF THE INVENTION

This invention relates to water vehicles and particularly to human or motor propelled water vehicles.

BACKGROUND OF THE INVENTION

There is a need for water vehicles that are more compact and more maneuverable than those currently available. Particularly, there is a need for a water bike where the flotation elements responsible for maintaining the water bike on the surface of a body of water also are responsible for moving the water bike through that body of water.

Presently, water bikes comprise stationary floatation elements responsible for at least in part keeping the water bike afloat on a body of water. This can result in a water bike that is bulker than necessary. In addition, the maneuverability can often be hampered.

There is still a need for a water vehicle in which all of the floatation elements necessary to allow the vehicle to float upon a body of water also are configured to provide motion of the water bike upon that body of water.

SUMMARY OF THE INVENTION

I have invented a water bike apparatus that has motion-inducing flotation elements with no stationary flotation elements necessary for the flotation of the apparatus. The invention has two aspects, an article aspect and a method aspect.

The water bike apparatus includes four apparatus elements. The first apparatus element is a frame with a front, a back, a top, a bottom, a left side, a right side, extended shaft guides, and a sitting element. The second apparatus element is a power assembly affixed to the frame and configured to be actuated to cause the water bike apparatus to move forward or rearward. The third apparatus element is a plurality of motion-inducing flotation elements having centers and an appropriate shape and size to cause the apparatus to float in a body of water. The motion-inducing flotation elements are in rotational communication with the power assembly, and are configured to provide forward or rearward movement of the water bike apparatus when the power assembly is actuated. The motion-inducing flotation elements are also configured to supply all of the flotation necessary to allow the water bike apparatus to float upon a body of water. The fourth apparatus element is a handle bar moveably attached through the frame to at least one receiving element configured to change the direction of motion of the water bike apparatus to other than forward and rearward. The disclosed water bike apparatus is configured to have no static flotation elements that provide necessary flotation of the water bike apparatus to allow it to float in a body of water are present.

The method of moving a water bike apparatus on a body of water includes three steps. The first step is providing a water bike apparatus as described above. The second step is transporting the water bike apparatus into a body of water. The third step is powering the water bike apparatus to rotate the motion-inducing flotation elements so as to move the water bike apparatus forward or backward in the body of water.

The invention has several advantages over currently known water bikes. The primary benefit is that it has a simpler construction since it contains no wasted stationary flotation elements necessary to float the apparatus on a body of water. In addition, it includes various embodiments that help in maneuverability of the water bike apparatus and various embodiments that provide different sources of power to the water bike apparatus.

BRIEF DESCRIPTION OF THE DRAWINGS

One or more features or preferred forms of the invention are described in the accompanying drawings. The drawings are described briefly below.

Figure 1:
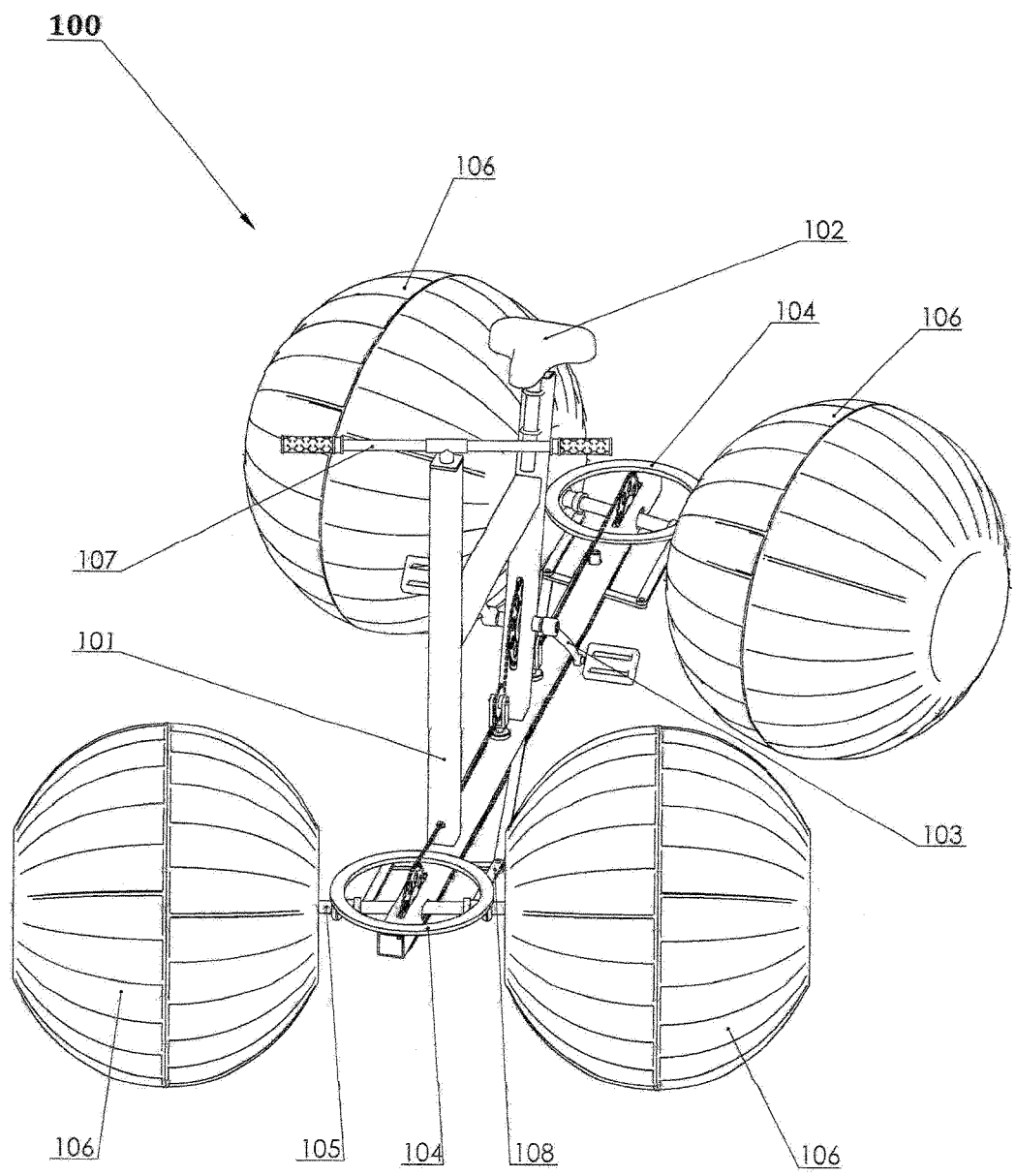
FIG. 1 is a perspective illustration of one embodiment of the invention with a horizontally-rotating extending shaft for steering, a pedal power assembly, and spherical motion-inducing flotation elements.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

My invention is a water bike apparatus and a method of using the water bike apparatus to move across the surface of a body or water. Currently water bikes are generally complex and contain at least one stationary flotation element necessary to allow the water bike to remain afloat upon a body of water. My invention is a water bike that is able to float upon a body of water with only motion-inducing flotation elements. No stationary flotation elements are necessary to achieve satisfactory flotation of the water bike apparatus with its desired occupants. While additional stationary flotation elements, such as, for example, flotation seat cushions, and life preservers may be used, they are not necessary to the flotation of the water bike of the invention upon a body of water.

My invention comprises an apparatus aspect and a method of using aspect. The water bike apparatus includes four apparatus elements, a frame, a power assembly, a plurality of motion-inducing flotation elements, and a handle bar. The first apparatus element is a frame. It has a front, a back, a top, a bottom, a left side, a right side, extending shaft guides, and a sitting element. The sitting element permits a person operating the water bike to sit at least some of the time while the water bike is floating upon a body of water, either in a stationary or moving position. The sitting element may comprise one or more saddles or seats and is affixed to the top of the frame. The extending shaft guide stabilizes the extending shaft to maintain a horizontal alignment. This prevents the water bike apparatus from tipping sidewise.

The second apparatus element is a power assembly. The power assembly is affixed to the frame and configured to be actuated so as to cause water bike apparatus to move forward or rearward. The power assembly may be energized by human effort, an electric motor, a hydrocarbon-fueled motor, or a combination of these.

The third apparatus element is a plurality of motion-inducing flotation elements. They have centers and are of an appropriate shape and size to cause the apparatus to float in a body of water. They are in rotational communication with the power assembly, and are configured to provide forward or rearward movement of the water bike apparatus when the power assembly is actuated. The motion-inducing flotation elements are also configured to supply all of the flotation necessary to allow the water bike apparatus to float upon a body of water. The disclosed water bike apparatus has no static flotation elements to provide any necessary flotation of the water bike apparatus. Static elements include flotation elements that turn as the apparatus moves though the water and may be turned by the handlebars to change direction as with a tricycle but provide no forward or rearward motion when in communication with the power assembly.

In one embodiment, the extended shafts can be rotationally within extended shaft holders that are stationary and affixed to the frame.

Configuration to provide movement involves having a shape, size, and outer surface that can allow movement of the water bike upon a body of water. The shape can be one that allows for the containment of something lighter than water such as, for example, air. Examples of suitable shapes include, for example, spheres and cylinders. The size can be one that, in aggregate, allows for the flotation of the water bike with desired number of people to float upon the surface of a body of water. Some immersion is inevitable because of the mass of the water bike and people. Any amount of immersion is suitable as long as there is sufficient flotation of the water bike apparatus to prevent it from sinking under the surface of the body of water. Thus the size should be sufficient to displace the weight of water that is more than the weight of the water bike apparatus and the person or persons on the water bike apparatus. The outer surface is one that causes the water bike apparatus to be pushed through the water in a forward or rearward direction as the motion-inducing flotation elements are rotated in a similar direction. Examples of a suitable surface include, for example, ridges or paddles aligned in a somewhat parallel manner in lines that may be straight or curved if on a cylinder shape or in concentric arcs if on a spherical shape.

Configuration to move in a forward or rearward direction can involve use of a plurality of extending shafts rotationally affixed to the bottom of the frame. In one embodiment, the extending shafts can be each affixed to a pair of motion-inducing flotation elements, one proximate the front of the frame and a second proximate the rear of the frame. In another embodiment, the extending shafts can be affixed to the bottom of the frame and rotationally affixed through individual couplings to individual motion-inducing flotation elements.

The fourth apparatus element is a handle bar. It is moveably attached through the frame to at least one receiving element that is configured to change the direction of motion of the water bike apparatus to other than forward and rearward. The direction may be changed by various forms of receiving elements, such as, for example, a horizontally-rotatable extending element, at least one propeller, and at least one rudder. While one receiving element can be sufficient to enable a change in direction of a water bike apparatus other than forward or rearward, at least two receiving elements acting in opposite directions can permit a change of direction that is faster and more controllable.

In one embodiment, the water bike apparatus can be configured to be moved left or right by making the receiving elements pivotable extended shafts. In this embodiment, the water bike further comprises a plurality of extending shafts that function as receiving elements and are pivotably and rotationally affixed to the bottom of the frame. The plurality of motion-inducing flotation elements can comprise at least a front pair and a rear pair of motion-inducing flotation elements with each pair rotationally mounted through the extending shaft to the power system. The handle bar is pivotably attached to the extending shaft of the front pair so as to cause the extending shaft of the front pair to horizontally pivot in one direction about its point of contact with the frame in the horizontally pivoted direction of the handle about its point of contact with the frame. At the same time the extending shaft of the rear pair horizontally can pivot in the direction about its point of contact with the frame in the opposite horizontally pivoted direction of the handle about its point of contact with the frame. The guide is a ring attached to the frame and position above each extending shaft.

In another embodiment, the water bike apparatus can be configured to be moved left or right through the receiving elements being pivotable couplings attached to non-pivotable extended shafts enclosed by the extended shaft guide. In this embodiment, the water bike can further comprises a plurality of extending shafts that are rotationally but not pivotably affixed to the bottom of the frame, and a coupling that functions as a receiving element and is also pivotably between each extending shaft and the center of the closest motion-inducing flotation element. The plurality of motion-inducing flotation elements can comprise at least a front pair and a rear pair of motion-inducing flotation elements with each pair rotationally mounted through the extending shaft to the power system. Each motion-inducing flotation element is pivotably coupled through the extending shaft to the handle bar. This can permit motion-inducing flotation elements on the right side of the frame to be angled closer at the coupling and motion-inducing flotation elements on the left side of the frame to be angled further apart at the coupling when the handle is rotated right. Alternatively, it permits motion-inducing flotation elements on the left side of the frame to be angled closer at the coupling and motion-inducing flotation elements on the right side of the frame to be angled further apart at the coupling when the handle is rotated left.

In another series of embodiments, the water bike apparatus can be configured to be moved left or right through the receiving elements being propellers. The direction of movement depends on whether the propellers are in the same side of the shaft or opposite side of the shaft, and whether the propellers configured to push or pull. In one embodiment of this series, the handle can further comprise a structure configured to provide power to the receiving element through horizontal rotation.

Typically the receiving element comprises a front propeller that is rotationally affixed to the bottom proximate to the front of the frame and a rear propeller that is rotationally affixed to the bottom proximate to the rear of the frame. Different aspects of this embodiment may perform differently depending of the rotation and the location of the forward and rearward propeller. The water bike apparatus can turn in one direction when both the front propeller and the rear propeller are located on the same side of the bottom, the front propeller is rotated in a clockwise direction and the rear propeller is rotated in a counterclockwise direction, and can turn in another direction when the front propeller is rotated in a counterclockwise direction and the rear propeller rotated in a clockwise direction. The direction of the turn of the water bike apparatus will be (1) clockwise when the propellers are configured to push water away from the bottom when they rotate in a clockwise direction and (2) when the propellers are configured to pull water toward the bottom when they rotate in a clockwise direction.

In another aspect, the water bike apparatus can turn in one direction when both the front propeller and the rear propeller are located on different sides of the bottom, the front propeller is rotated in a clockwise direction and the rear propeller is rotated in a clockwise direction, and can turn in another direction when the front propeller is rotated in a counterclockwise direction and the rear propeller rotated in a counterclockwise direction. In one embodiment, the direction of the turn of the water bike apparatus will be (1) clockwise when the propellers are configured to push water away from the bottom when they rotate in a clockwise direction and (2) when the propellers are configured to pull water toward the bottom when they rotate in a clockwise direction.

As mentioned above, in another aspect of this embodiment, the handle can further comprise a structure that is configured to provide power to the receiving element through horizontal rotation. Through judicious selection of connection element well known to the art, horizontal rotation of the handle will result in rotation of the propellers in the same or different directions.

In one embodiment, the water bike apparatus can be configured to be moved left or right through the receiving elements being rudders. In this embodiment, the receiving element can comprise a front rudder that is rotatably affixed to the bottom of the front of the frame and a rear rudder that is rotatably affixed to the bottom of the rear of the frame. The water bike apparatus can turn to the left when the front rudder is rotated to the left of the frame and the rear is rotated to the right of the frame, and can turn to the right when the front rudder rotated to the right of the frame and the rear rudder rotates to the left of the frame.

The water bike apparatus of the invention can be made with materials and manufacturing processes known to the art of making bicycles and flotation equipment. As weight and resistance to rusting are concerns, plastics, foams, composites, and other light weight corrosion resistant materials are preferred.

Some embodiments of the invention may be disassembled for easy transportation and storage. The motion-inducing floatation elements may be attached to the extending shaft with easily removed elements in a similar manner extending shafts may be disassembled from the frame. In some embodiments the motion-inducing floatation elements may be further broken apart.

The method of moving a water bike apparatus on a body of water can include three steps. The first step is providing a water bike apparatus as described above. The second step can be transporting the water bike apparatus into a body of water. The third step can be powering the water bike apparatus to rotate the motion-inducing flotation elements with paddles in order to move the water bike apparatus forward or backward in water.

In several embodiments several methods of affecting turning of the water bike apparatus can be employed where the receiving elements are pivoting extending shafts, propellers, or rudders. In one embodiment, the water bike apparatus can further comprise a plurality of extending shafts that can function as receiving elements and can be pivotably and rotationally affixed to the bottom of the frame. The plurality of motion-inducing flotation elements can comprise at least a front pair and a rear pair of motion-inducing flotation elements with each pair rotationally mounted through the extending shaft to the power system. The handle bar can be pivotably attached to the extending shaft of the front pair to cause (1) the extending shaft of the front pair to horizontally pivot in one direction about its point of contact with the frame in the horizontally pivoted direction of the handle about its point of contact with the frame; and (2) the extending shaft of the rear pair to horizontally pivot in the direction about its point of contact with the frame in the opposite horizontally pivoted direction of the handle about its point of contact with the frame. The method further comprises the step of directing the steering of the water bike apparatus to move it in a direction other than forward or rearward.

In another embodiment, the water bike apparatus can further comprise a plurality of extending shafts that can be rotationally but not pivotably affixed to the bottom of the frame. The water bike apparatus also can comprise a coupling that functions as a receiving element and can be pivotably affixed between each extending shaft and the center of the closest motion-inducing flotation element. The plurality of motion-inducing flotation elements can comprise at least a front pair and a rear pair of motion-inducing flotation elements with each pair rotationally mounted through the extending shaft to the power system. Each motion-inducing flotation element can be pivotably coupled through the extending shaft to the handle bar. This can permit motion-inducing flotation elements on the right side of the frame to be angled closer at the coupling and motion-inducing flotation elements on the left side of the frame to be angled further apart at the coupling when the handle is rotated right. Alternatively, this can permit motion-inducing flotation elements on the left side of the frame to be angled closer at the coupling and motion-inducing flotation elements on the right side of the frame to be angled further apart at the coupling when the handle is rotated left. The method can further comprise the step of directing the steering of the water bike apparatus to move it in a direction other than forward or rearward.

In another embodiment, the water bike apparatus handle can further comprise a structure configured to provide power to the receiving element through horizontal rotation. The receiving element can comprise a front propeller rotationally affixed to one side of the bottom proximate the front of the frame and a rear propeller rotationally affixed to the other side of the bottom proximate the rear of the frame. The water bike apparatus can turn in one direction when the front propeller rotated in a clockwise direction and the rear propeller in a counterclockwise direction and can turn in another direction when the front propeller rotated in a counterclockwise direction and the rear propeller rotated in a clockwise direction. The method can further comprise the step of directing the steering of the water bike apparatus to move it in a direction other than forward or rearward.

In the above embodiment, the direction can be clockwise when the propellers are configured to push when moving clockwise and the direction can be counterclockwise when the propellers are configured to pull when moving clockwise.

In another embodiment, the water bike apparatus handle can further comprise a structure configured to provide power to the receiving element through horizontal rotation. The receiving element can comprise a front propeller rotationally affixed to one side of the bottom proximate the front of the frame and a rear propeller rotationally affixed to the other side of the bottom proximate the rear of the frame. The water bike apparatus can turn in one direction when both the front propeller and the rear propeller are rotated in a clockwise direction and can turn in another direction when both the front propeller and the rear propeller are rotated in a counterclockwise direction. This method can further comprise the step of directing the steering of the water bike apparatus to move it in a direction other than forward or rearward.

In the above embodiment the direction can be clockwise when the propellers are configured to push when moving clockwise and the direction can be counterclockwise when the propellers are configured to pull when moving counterclockwise. The method can further comprise the step of directing the steering of the water bike apparatus to move it in a direction other than forward or rearward.

In still another embodiment, the water bike apparatus receiving element can further comprise a front rudder rotatably affixed to the bottom of the front of the frame and a rear rudder rotatably affixed to the bottom of the rear of the frame. The water bike apparatus can turn to the left when the front rudder is rotated to the left and the rear is rotated to the left and can turn to the right when the front rudder rotated to the right and the rear rudder rotates to the right. The method can further comprise the step of directing the steering of the water bike apparatus to move it in a direction other than forward or rearward.

The invention may be further understood through several figures of various embodiments of the invention.

FIG. 1 is a perspective illustration of one embodiment of the invention with a horizontally rotating extending shaft for steering, pedal power assembly, and spherical motion-inducing flotation elements. An embodiment of a water bike apparatus (100) is illustrated. A frame (101) is attached to a sitting element (102) and a power assembly (103) shown as a pedaling assembly. Frame (101) is also attached to extending shaft guides (104), shown as a stabilizing rings, that are above extending shafts (105) that are attached to motion-inducing flotation elements (106), shown as spherical in shape. A handle bar (107) is in communication with a receiving elements (108) shown as pivoting extending shafts that pivot when handle bar 107 is pivoted.

Figure 2:
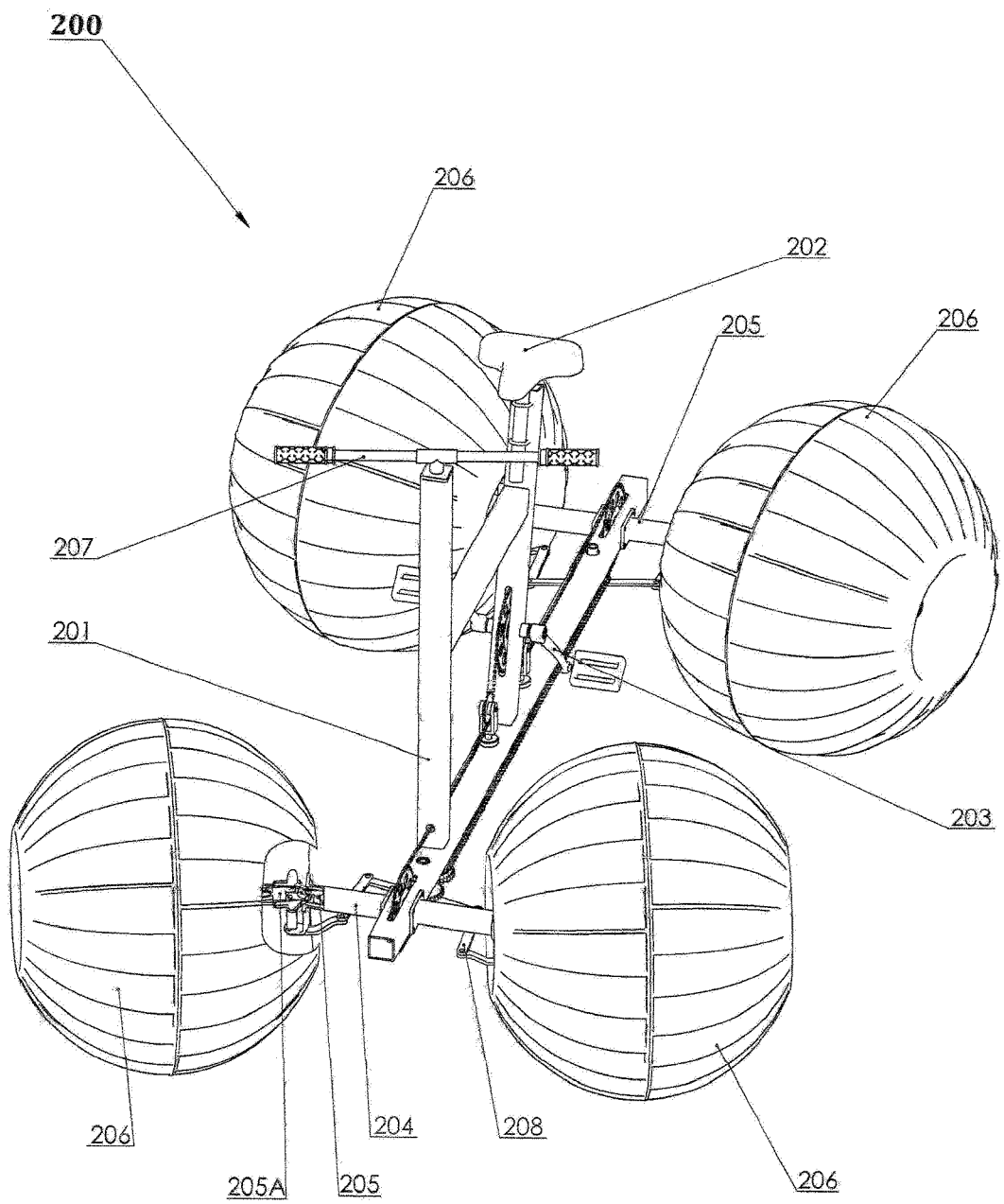
FIG. 2 is a perspective illustration of one embodiment of the invention with horizontal rotation of individual motion-inducing flotation elements for steering, a pedal power assembly, and spherical motion-inducing flotation elements.
Figure 3:
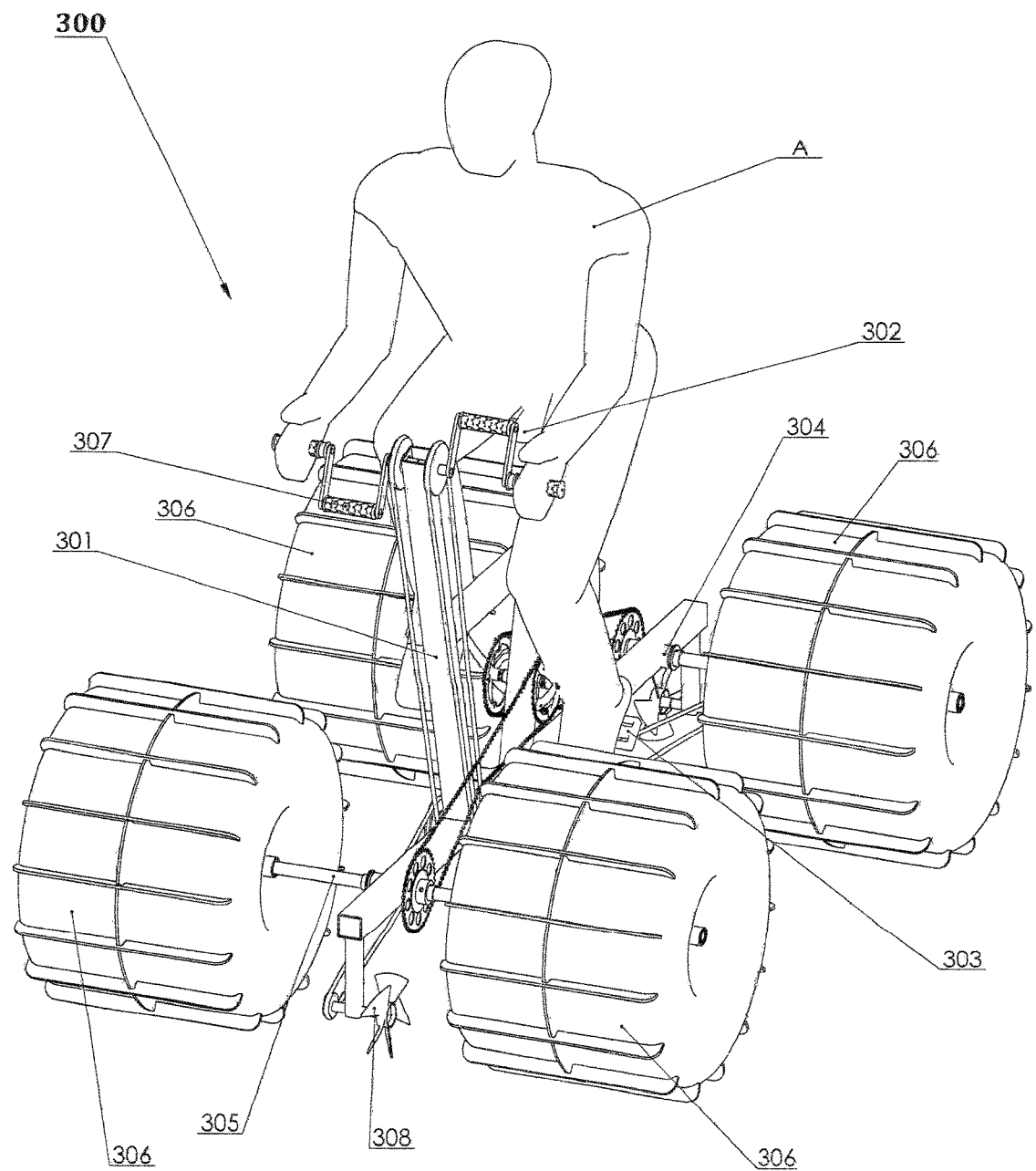
FIG. 3 is a perspective illustration of one embodiment of the invention with propellers for steering, a pedal power assembly, and cylindrical motion-inducing flotation elements.

FIG. 2 is a perspective illustration of one embodiment of the invention with horizontal rotation of individual motion-inducing flotation elements for steering, pedal power assembly, and spherical motion-inducing flotation elements. An embodiment of a water bike apparatus (200) is illustrated. A frame (201) is attached to a sitting element (202) and a power assembly (203) shown as a pedaling assembly. Frame 201 is also attached to extending shaft guides (204) that enclose extending shafts (205) that attach to pivotable couplings (205A) that attach to motion-inducing flotation elements (206) shown as spherical in shape. A handle bar (207) is in communication with receiving elements (208) shown as moving back and forth when handle bar 207 is pivoted FIG. 3 is a perspective illustration of one embodiment of the invention with propellers for steering, pedal power assembly, and cylindrical motion-inducing flotation elements. An embodiment of a water bike apparatus (300) is illustrated with a person (A). A frame (301) is attached to a power assembly (303), shown as a pedaling assembly. Frame 301 is also attached to extending shaft guides (304) that enclose extending shafts (305) that attach to motion-inducing flotation elements (306), shown as cylindrical in shape. A handle bar (307) is in communication with receiving elements (308) shown as propellers that rotate when handle bar 307 is rotated horizontally.

Figure 4:
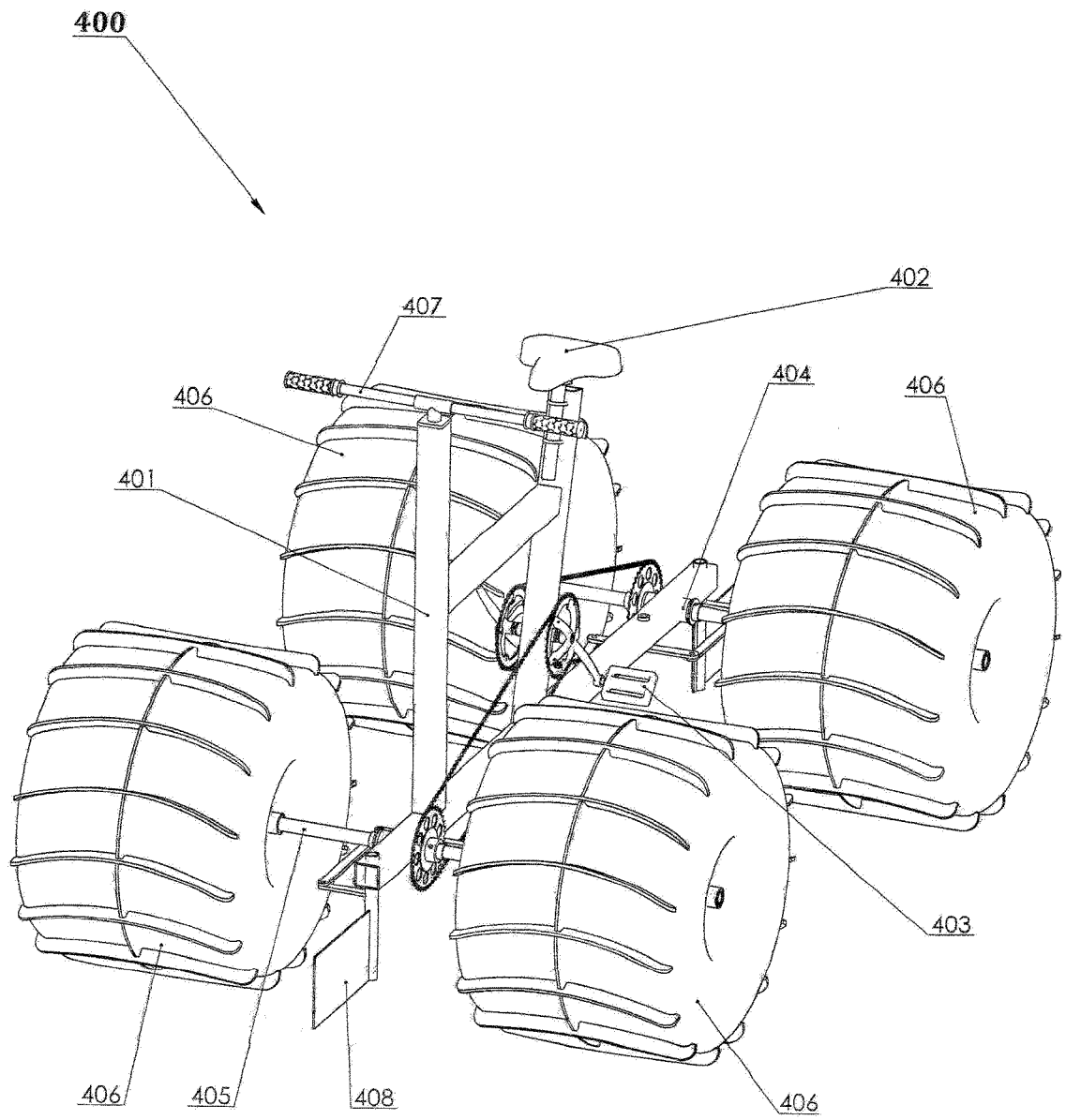
FIG. 4 is a perspective illustration of one embodiment of the invention with rudders for steering, a pedal power assembly, and cylindrical motion-inducing flotation elements.

FIG. 4 is a perspective illustration of one embodiment of the invention with rudders for steering, pedal power assembly, and cylindrical motion-inducing flotation elements. An embodiment of a water bike apparatus (400) is illustrated. A frame (401) is attached to a sitting element (402) and a power assembly (403), shown as a pedaling assembly. Frame 401 is also attached to extending shaft guides (404) that enclose extending shafts (405) that attach to motion-inducing flotation elements (406), shown as cylindrical in shape. A handle bar (407) is in communication with receiving elements (408), shown as rudders that rotate when handle bar 407 is rotated.

Figure 5:
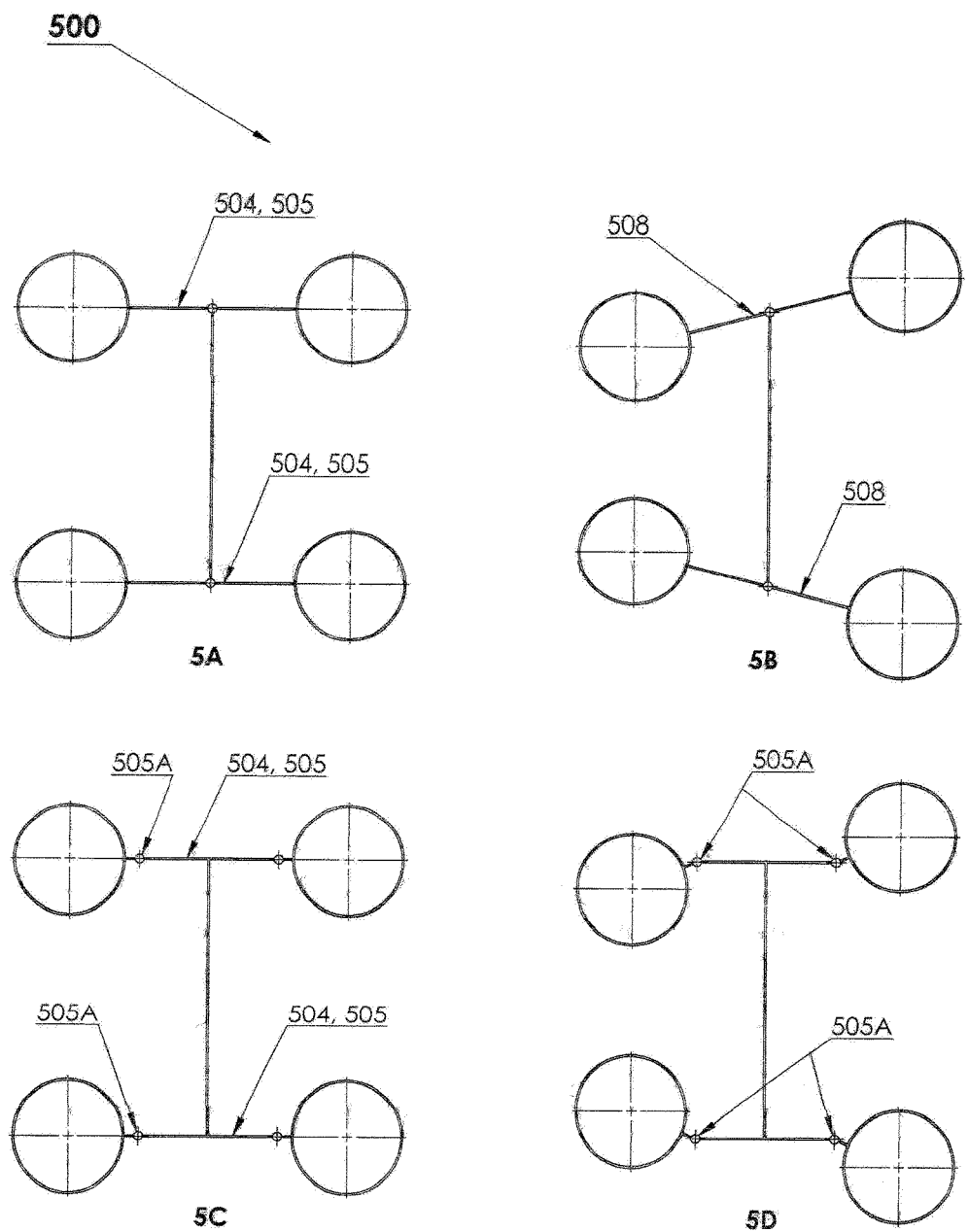
FIG. 5 is an illustration of an axle configuration for a steering wheel pair embodiment (5A and 5B) and an individual steering wheel embodiment (5C and 5D).

FIG. 5 is an illustration of an axle configuration shown in FIG. 1 and FIG. 2. FIG. 5A and FIG. 5B depict the axle layout for the steering wheel pair embodiment shown in FIG. 1 where the apparatus is moving straight ahead or turning to the left, respectfully. FIG. 5C and FIG. 5D depict the axle layout for the individual steering wheel embodiment shown in FIG. 2 where the apparatus is moving straight ahead or turning to the left, respectfully. In FIG. 5A and FIG. 5B, rotationable extending shafts (505) are shown attached to the motion-inducing flotation elements. In FIG. 5B, the extending shafts are receiving elements (508) and are shown pivoted to make a turn to the left. In FIG. 5C and 5D, rotational extending shafts 505 are shown rotationally and pivotally attached to coupling elements (505A) that are attached to the motion-inducing flotation elements. In FIG. 5D, couplings 505A are acting as receiving elements 508 and pivoted about the ends of extending shafts 505 to make a turn to the left.

Figure 6:
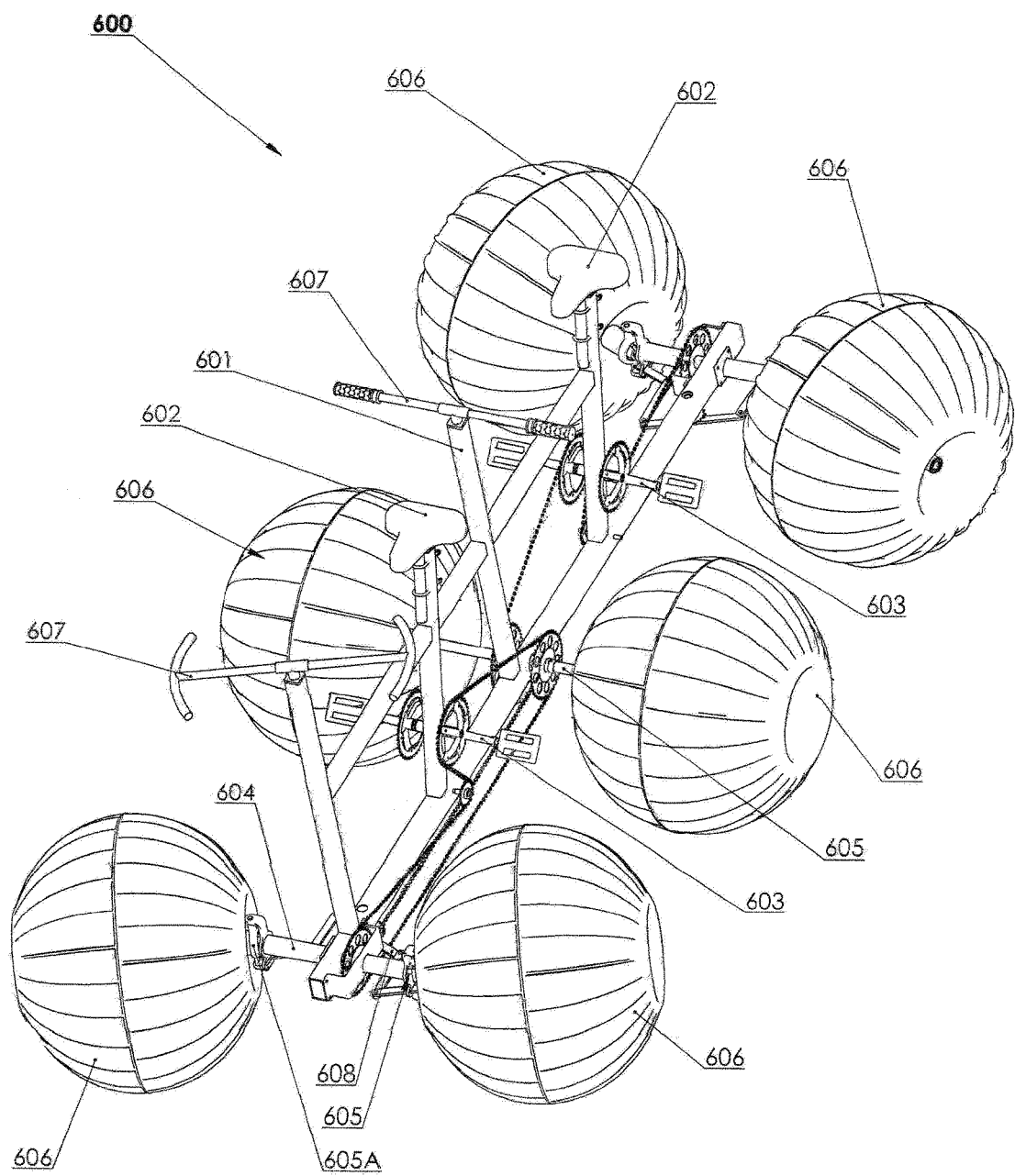
FIG. 6 is a perspective illustration for an embodiment of the invention with two saddles, a pedal power assembly, and six spherical motion-inducing flotation elements.

FIG. 6 is a perspective illustration for an embodiment of the invention with two saddles, pedal power assembly, and six spherical motion-inducing flotation elements. An embodiment of water bike apparatus (600) is illustrated that is similar to that of FIG. 2 except a second saddle and a third pair of motion-inducing flotation elements that are not configured to turn in directions other than forward and rearward are included. A frame (601) is attached to a sitting element (602) shown as two saddles and a power assembly (603) shown as two pedaling assemblies. Frame 601 is also attached to forward, center, and rearward extending shaft guides (604) that enclose extending shafts (605). Only the forward and rearward extending shafts are attached to a pivotable coupling (605A) that attach to a motion-inducing flotation elements (606) showed as spherical in shape. The center extending shaft is just attached to coupling 605A that attach to motion-inducing flotation elements (606). A handle bar (607) is in communication with a receiving elements (608) shown as moving back and forth when the handle bar 607 is pivoted.

Figure 7:
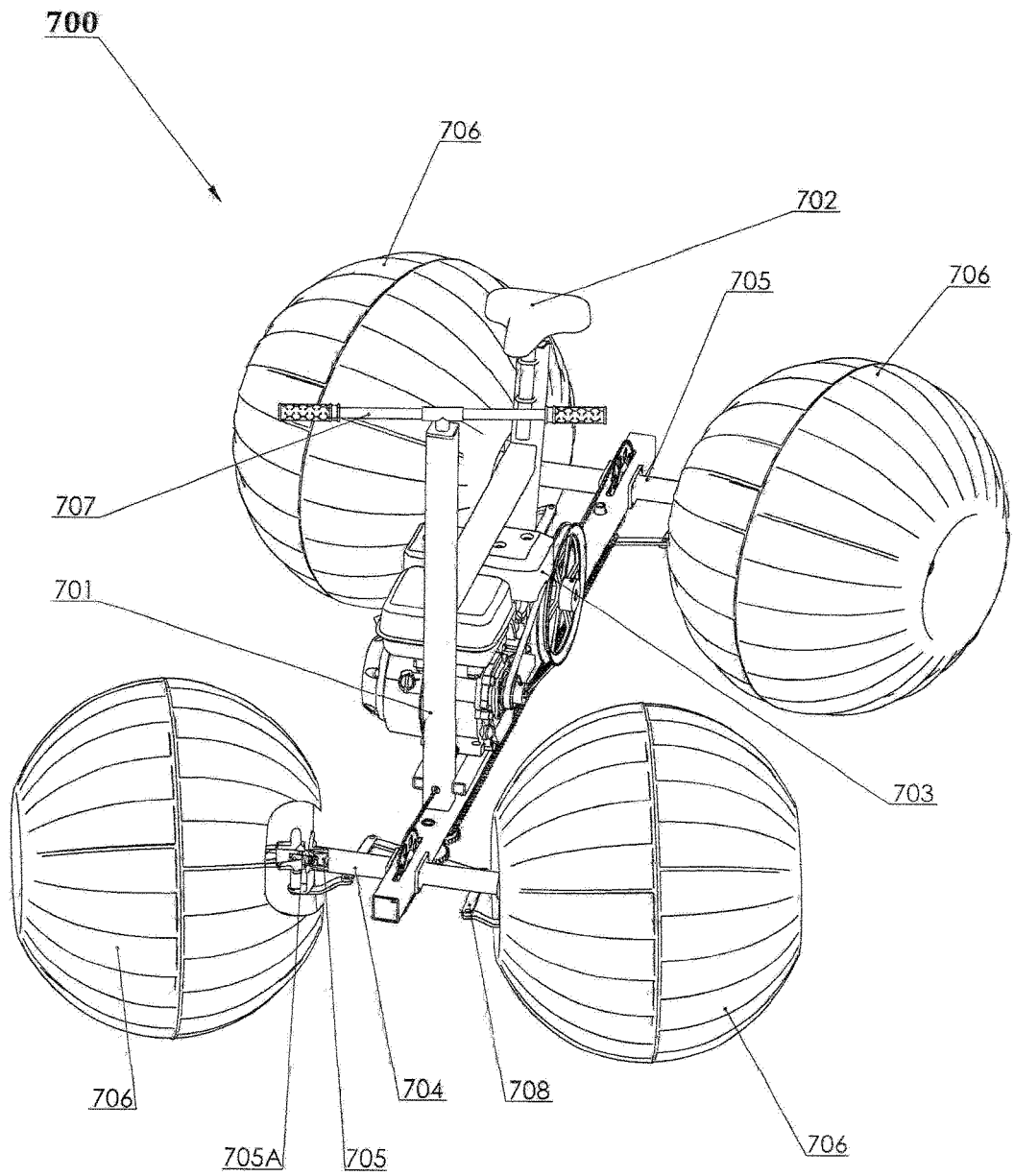
FIG. 7 is a perspective illustration of one embodiment of the invention with horizontal rotation of individual motion-inducing flotation elements for steering, motor power assembly, and spherical motion-inducing flotation elements.

FIG. 7 is a perspective illustration of one embodiment of the invention with horizontal rotation of individual motion-inducing flotation elements for steering, motor power assembly, and spherical motion-inducing flotation elements. An embodiment of a water bike apparatus (700) is illustrated. A frame (701) is attached to a sitting element (702) and a power assembly (703) shown as a motor assembly. Frame 701 is also attached to extending shaft guides (704) that enclose extending shafts (705) that attach to pivotable couplings (705A) that attach to motion-inducing flotation elements (706) shown as spherical in shape. A handle bar (707) is in communication with receiving elements (708) shown as moving back and forth when handle bar 707 is pivoted.

The above invention may also be used to move over other bodies of fluid such as, for example, snow in the form of loose powder.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. A water bike apparatus, comprising:
   a frame with a front, a back, a top, a bottom, a left side, a right side, extended shaft guides, and a sitting element;
   a power assembly affixed to the frame and configured to be actuated to cause water bike apparatus to move forward or rearward,
   a plurality of motion-inducing flotation elements having centers and an appropriate shape and size to cause the apparatus to float in a body of water, being in rotational communication with the power assembly, and configured to provide forward or rearward movement of the water bike apparatus when the power assembly is actuated, the motion-inducing flotation elements configured to supply all of the flotation necessary to allow the water bike apparatus to float upon a body of water,
   a handle bar moveably attached through the frame to at least one receiving element configured to change the direction of motion of the water bike apparatus to other than forward and rearward, and
   a plurality of extending shafts that are pivotably and rotationally affixed through the receiving elements to the bottom of the frame, and
   wherein the plurality of motion-inducing flotation elements comprise at least a front pair and a rear pair of motion-inducing flotation elements with each pair rotationally mounted through the extending shaft to the power system and wherein the handle bar is pivotably attached through receiving elements to the extending shaft of the front pair to cause the extending shaft of the front pair to horizontally pivot in one direction about its point of contact with the frame in the horizontally pivoted direction of the handle bar about its point of contact with the frame and the extending shaft of the rear pair to horizontally pivot in the direction about its point of contact with the frame in the opposite horizontally pivoted direction of the handle bar about its point of contact with the frame.

2. The apparatus of claim 1, wherein the power assembly is energized by human effort, an electric motor, a hydrocarbon fueled motor, or a combination of thereof.

3. The apparatus of claim 1, wherein the sitting element comprises one or more saddles affixed to the top of the frame.

4. The apparatus of claim 1 wherein the shape of the motion-inducing flotation elements are spherical.

5. The apparatus of claim 1 wherein the shape of the motion-inducing flotation elements are cylindrical.

6. A method of moving a water bike apparatus on a body of water, comprising the steps of:
   providing a water bike apparatus, comprising:
   a frame with a front, a back, a top, a bottom, a left side, a right side, extended shaft guides, and a sitting element,
   a power assembly affixed to the frame and configured to be actuated to cause water bike apparatus to move forward or rearward,
   a plurality of motion-inducing flotation elements having centers and an appropriate shape and size to cause the apparatus to float in a body of water, being in rotational communication with the power assembly, and configured to provide forward or rearward movement of the water bike apparatus when the power assembly is actuated, the motion-inducing flotation elements configured to supply all of the flotation necessary to allow the water bike apparatus to float upon a body of water,
   a handle bar moveably attached through the frame to at least one receiving element configured to change the direction of motion of the water bike apparatus to other than forward and rearward, and
   a plurality of extending shafts that are pivotably and rotationally affixed through the receiving elements to the bottom of the frame, and
   wherein the plurality of motion-inducing flotation elements comprise at least a front pair and a rear pair of motion-inducing flotation elements with each pair rotationally mounted through the extending shaft to the power system and wherein the handle bar is pivotably attached through receiving elements to the extending shaft of the front pair to cause the extending shaft of the front pair to horizontally pivot in one direction about its point of contact with the frame in the horizontally pivoted direction of the handle bar about its point of contact with the frame and the extending shaft of the rear pair to horizontally pivot in the direction about its point of contact with the frame in the opposite horizontally pivoted direction of the handle bar about its point of contact with the frame and wherein no static flotation elements configured to provide necessary flotation of the water bike apparatus to allow it to float in a body of water are present;
   transporting the water bike apparatus into a body of water;
   powering the water bike apparatus to rotate the motion-inducing flotation elements with paddles to move the water bike apparatus forward or backward in water;
   directing the steering of the water bike apparatus to move it in a direction other than forward or rearward.

* * * * *